United States Patent [19]

Stoll

[11] Patent Number: 5,485,867
[45] Date of Patent: Jan. 23, 1996

[54] CHOKE VALVE

[75] Inventor: Kurt Stoll, Esslingen, Germany

[73] Assignee: Festo KG, Esslingen, Germany

[21] Appl. No.: 249,814

[22] Filed: May 26, 1994

[30] Foreign Application Priority Data

May 27, 1993 [DE] Germany .................... 43 17 604.6

[51] Int. Cl.$^6$ .................................. F16K 47/04
[52] U.S. Cl. .......................... 137/599; 137/859
[58] Field of Search ...................... 137/599, 859; 251/267

[56] References Cited

U.S. PATENT DOCUMENTS

| | | | |
|---|---|---|---|
| 174,781 | 3/1876 | Clemens | 251/267 X |
| 903,451 | 11/1908 | Clark | 251/267 X |
| 1,652,929 | 12/1927 | Cawood | 251/267 X |
| 2,924,237 | 2/1960 | Ellis | 137/599.2 |
| 3,056,423 | 10/1962 | Lieser | 137/493.7 |
| 3,857,405 | 12/1974 | Heideman | 137/599 X |
| 3,874,408 | 4/1975 | Gryglas | 137/599 |
| 4,073,311 | 2/1978 | McGeachy . | |
| 4,413,806 | 11/1983 | Anderson | 251/267 X |
| 4,495,965 | 1/1985 | Ise . | |
| 5,183,076 | 2/1993 | Guillin et al. . | |
| 5,205,594 | 4/1993 | Stoll et al. . | |
| 5,269,346 | 12/1993 | Yuda | 137/599 |

FOREIGN PATENT DOCUMENTS

| | | |
|---|---|---|
| 0475833 | 3/1992 | European Pat. Off. . |
| 2511744 | 2/1983 | France . |
| 4007101 | 7/1991 | Germany . |

*Primary Examiner*—Stephen M. Hepperle
*Attorney, Agent, or Firm*—Hoffmann & Baron

[57] ABSTRACT

A choke valve, which comprises a housing wherein a choke duct extends. Two connection ports of the choke duct render possible the connection of means for the supply and removal of driving fluid. A choke member cooperates with the choke duct and is able to be set for the regulation of the flow rate. One of the connection ports is provided on the choke member, the adjoining portion of the choke duct extending through the choke member. It is in this manner that one connection side of the valve is also the adjustment side of the choke valve, something which reduces the amount of space for the fitting thereof.

13 Claims, 2 Drawing Sheets

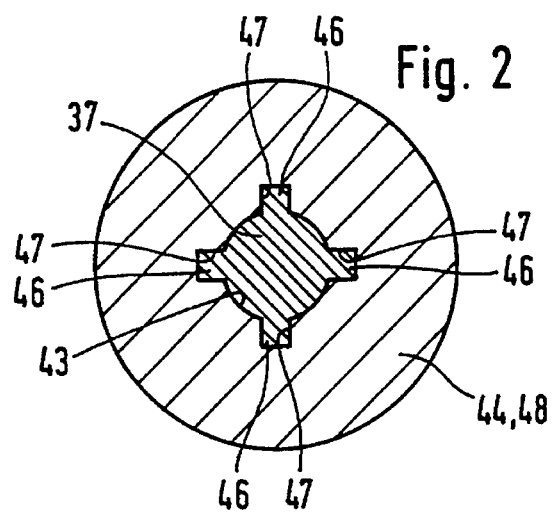
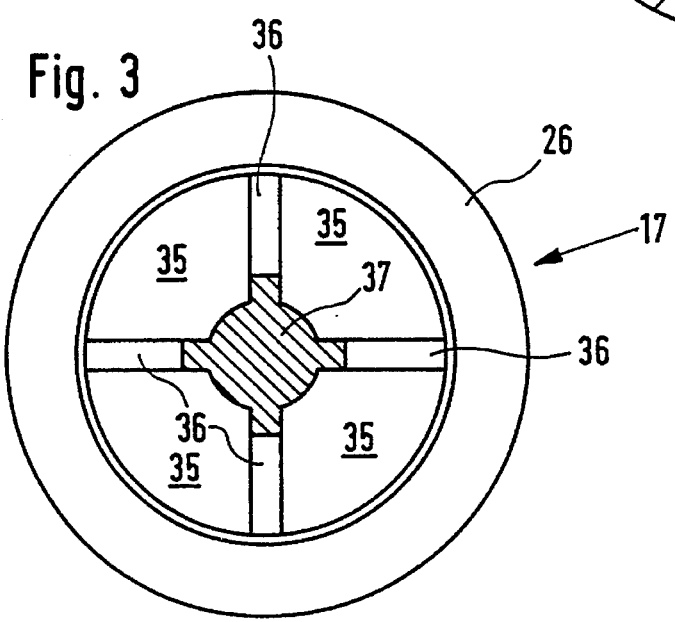
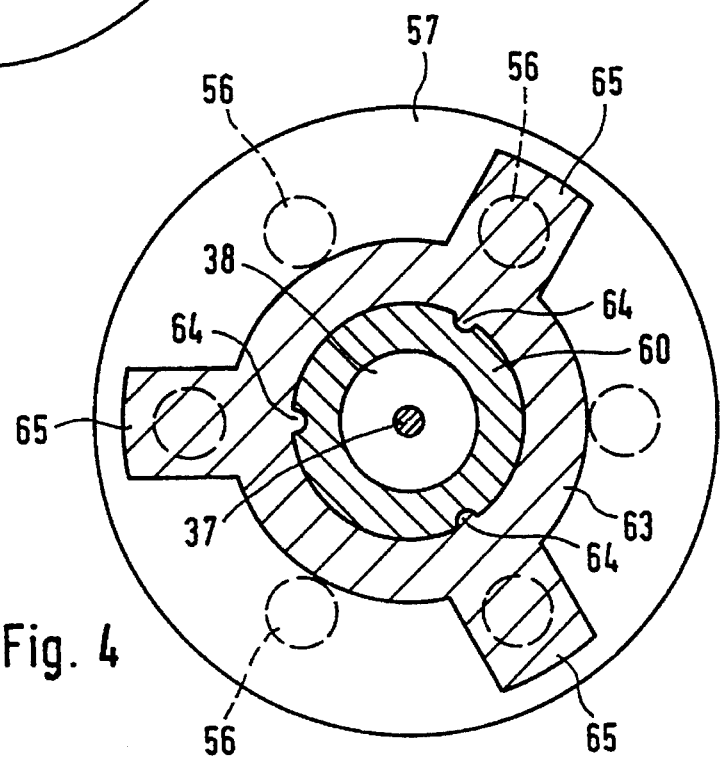

5,485,867

CHOKE VALVE

DESCRIPTION OF THE PRIOR ART

The invention relates to a choke valve comprising a housing wherein a choke duct extends to be in communication with two connection ports for the supply and/or removal of driving fluid and a choke member arranged on the housing to cooperate with the choke duct and able to be set by being moved in two opposite directions for altering the flow aperture in a setting direction in relation to the housing.

DESCRIPTION OF THE PRIOR ART

Such a choke valve, designed in the form of a choke check valve, has been marketed by the assignee for some time under the designation GRLA. In such known choke valve the housing is made in two parts, on which one of the connection ports is provided which are set at a right angle to one another. The choke member constituted by a choke screw is inserted from a third side in the housing part and may be set axially by turning it so that it is screwed to a lesser or greater extent into the choke duct. Ducts leading to other parts of associated equipment can be connected with the two connection ports and may for instance be in the form of a pneumatic device as for example a fluid power cylinder or simply constituted by pressure ducts such as hose.

The known choke valve accordingly possesses two connection sides and an adjustment side, at which the setting of the choke member is performed. In order to be able to perform any desired alterations of the choke setting, the adjustment side must always be accessible in the mounted condition of the choke valve. This is something leading to limitations for the installation of the choke valve or of the device connected with it. Sufficient space must be left free on the adjustment side and may not be obstructed by adjacent parts of the equipment.

SHORT SUMMARY OF THE INVENTION

One object of the invention is to create a choke valve of the type initially mentioned, which needs less space for the installation thereof without impairing the possibilities of setting it.

In order to achieve these and/or other objects appearing from the present specification, claims and drawings, in the present invention one of the connection ports is provided on the choke member it being directed in the setting direction and the section, which is adjacent to it, of the choke duct extending through the choke member.

Accordingly the setting side of the choke valve is also one of the two connection sides. Therefore it is unnecessary for any additional installation space to be provided for the resetting of the choke member. That peripheral part of the choke valve is utilized which owing to a device or duct or the like connected here is in any case not available for other uses. Accordingly the installation space required for the choke valve is generally reduced, there being the further advantage that the choke valve is substantially more compact than in the prior art.

Further advantageous forms of the invention are recited in the claims.

One further development contemplated by the invention, in which the two connection ports are associated with opposite sides of the housing of the choke valve with a coaxial alignment, may be incorporated in a more especially space saving fashion in an in-line fluid power piping system. While it is true that choke valves with such an alignment are not new and the assignee itself has long supplied such a valve with the designation GRO, in this case the adjustment of the intensity of the choke effect is to be performed from the side, the choke member being arranged and having to be adjusted at a right angle to the in-line piping. However, on the contrary, in the design of the invention both the two connection sides or ends and also the adjustment side or end are coaxial so that all in all there is an extremely slim construction.

The choke valve in accordance with the invention is preferably designed in the form of a choke check valve and possesses a suitable check valve device. The latter is, in the case of port openings arranged coaxially to one another, preferably set coaxially between the same. At least one of the two connection openings, more especially the one, which is integrated in the choke member, preferably possesses a plug connecting device for fluid power lines, such as hoses, which render possible a rapid connection and removal of respective lines such as hoses. A design which is extremely short in the direction of setting can be achieved in this respect if the choke member itself constitutes the housing of such a plug connection device. The choke duct section extending through the choke member and adjoining the connection port of the choke member may serve as a means for cooperating with a gripping ferrule, a design being more especially selected like that explained in detail in the German patent publication 4,007,101 C1.

The plug connecting device arranged on the choke member is so conceived that the pipe or hose part is freely rotatable in relation to the choke member around an axis coinciding with the direction of setting. Such a design is more especially advantageous when the flow aperture is to be varied in the course of a screwing movement of the choke member. In the case of one advantageous further development, the housing and the choke member maintain their position in relation to the axis extending in the setting direction, since between the housing and the choke member a rotatable actuating member is provided, which is in screw threaded connection with the choke member, which is locked and not able to be rotated. As a thread it is for example possible to provide a conventional screw thread, more particularly a fine gage one. The helical angle of the thread can however be selected as required, the same applying for the number starts of the screw thread. For locking after having set the desired choking effect or intensity it is possible to provide a lock nut borne by the choke member and cooperating with the actuating element.

Further advantageous developments and convenient forms of the invention will be understood from the following detailed descriptive disclosure of one embodiment thereof in conjunction with the accompanying drawings.

LIST OF THE SEVERAL VIEWS OF THE FIGURES.

FIG. 2 represents a cross section taken through the choke valve of FIG. 1 on the line II—II.

FIG. 3 is a cross section taken through the choke valve of FIG. 1 on the line III—III.

FIG. 4 is a cross section taken through the choke valve of FIG. 1 on the line IV—IV.

DETAILED ACCOUNT OF WORKING EMBODIMENT OF THE INVENTION

Figure 1:
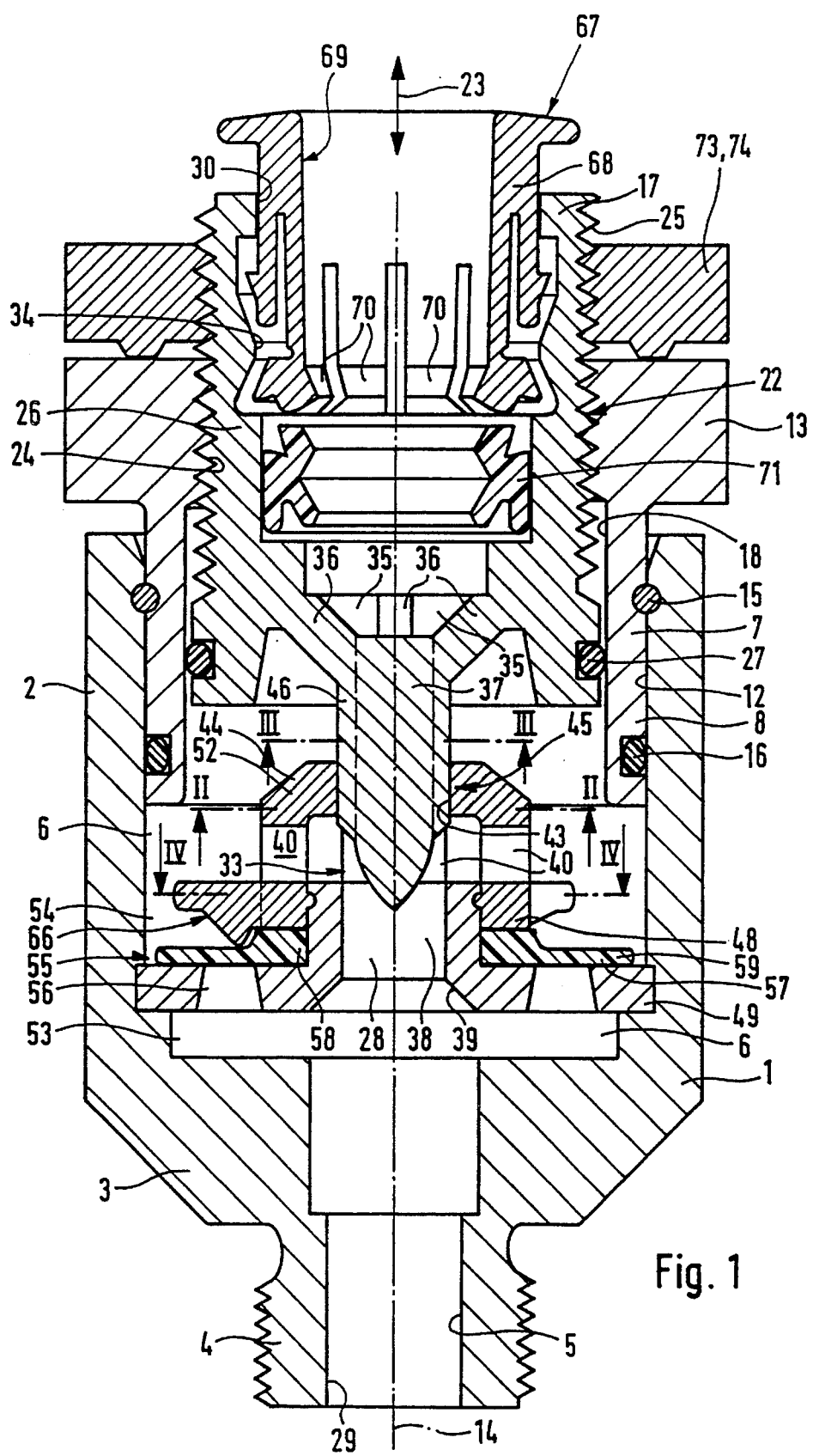
FIG. 1 shows a first design of the choke valve in accordance with the invention in the form of a choke check valve, in longitudinal section.

The choke valve, illustrated by way of example, having an adjustable choke comprises a cup-like housing 1 with a cylindrical side wall and a floor 3 adjoining the same at the end and having a central screw nipple 4. The floor has a first duct section 5 extending coaxially therethrough and connecting the internal space 6 of the housing (defined by the side wall 2) with the surroundings.

In the internal space 6 of the housing a ring-like actuating element 7 is inserted coaxially from the open end side opposite to the floor 3. This element possesses a sleeve-like guide portion 8, which makes sliding engagement with the internal surface 12 of the side wall 2. An annular actuating portion 13 is molded on the guide portion 8 externally of the housing 1 and it extends radially outward past the guide portion 8 in the manner of a collar so that it is axially supported on the associated end surface of the side wall 2.

The actuating element 7 is able to be freely rotated about the longitudinal axis 14 of the housing as its axis of rotation in relation to the housing 1. The relative axial position between the actuating element 7 and the housing 1 is on the contrary set once and for all. This is achieved in the illustrated working embodiment since both parts have concentric peripherally extending recesses at the same level adjacent to their contact surfaces, into both which recesses an inserted locking ring 15 fits, which allows for the necessary rotational freedom.

Furthermore radially between the guide portion 8 and the side wall 2 there is a seal ring 16 providing a sealing effect between the two parts and which in the illustrated working embodiment is held in an external peripheral groove in the internally arranged guide portion 8.

A choke member 17 is mounted in the central opening 18 in the actuating element 7. The choke member 17 is so mounted on the actuating element 7 by means of a threaded connection 22 that when there is a relative movement between these two parts there will be axial motion of the choke member 17 along the longitudinal axis 14 of the housing, such linearly extending direction of movement being termed the setting direction 23 herein. Since the choke member 17 is prevented from rotating in relation to the housing 1 in a manner yet to be explained, the choke member 13 may be shifted into the internal space 6 of the housing or out of the same by rotating the actuating element 7 on the actuating portion 13 in accordance with the selected direction of rotation.

The screw threaded connection 22 is so conceived in the embodiment of the invention that a female thread 24 is provided on the actuating element 7 adjacent to the central opening 18 and the thread 24 has an axial length preferably equal to the axial length of the actuating portion 13. The female screw thread 24 engages an external screw thread 25 on a sleeve-shaped portion 26 of the length of the choke member 17, the axial length of the external screw thread portion exceeding that of the female screw thread portion. The dimensions are so matched to each other that the choke member 17 has the necessary adjustment range in the setting direction 23.

The choke member 17 is provided with means producing a seal between it and the actuating element 7, a sealing ring 27 being provided between the two parts, which in the illustrated working embodiment is held in a external peripheral groove in the sleeve-shaped portion 26 of the length.

A choke duct 28 extends through the housing 1 and opens into the surroundings through two connection openings or ports 29 and 30. Via such connection openings 29 and 30 it is possible for driving fluid, more particularly compressed air, to be respectively supplied and/or let off so that it will flow through the choke duct 28 between the two connection openings 29 and 30. In the internal space 6 of the housing a choke constriction 33 is provided between the ends of the choke duct 28 and at which the flow aperture available for the driving fluid may be reduced in an adjustable fashion so as to be less than in the adjacent duct portions in order in this manner to regulate the rate of driving fluid flow for adaptation to the needs of a load connected with the valve. The flow aperture respectively present at the choke constriction 33 is dependent on the instantaneous setting of the choke member, such setting being able to be changed steplessly by adjustment in the setting direction 23.

The first connection port 29 is provided on the housing 1 and is constituted by the external opening of the first duct portion 5. The second connection opening 30 on the contrary is not provided on the housing 1 but on the choke member 17. It points in the direction 23 of setting, i.e. the plane of its aperture extends at a right angle to such direction 23 of setting. Preferably the arrangement is so designed that the longitudinal axis 14 of the housing constitutes the center of the second connection opening 30, the longitudinal axis 14 of the housing also constituting the center of the first connection opening 29 in the illustrated working embodiment so that the two connection openings 29 and 30 are coaxial and are arranged on opposite sides of the housing. This arrangement renders possible a switching on of the choke valve in an in-line piping arrangement without any problems.

The choke member 17 has a second duct portion 34 extending axially therethrough, such portion 34 being connected with the second connection opening 30 and opening into the internal space 6 of the housing. Like the first duct portion 5 it constitutes a part of the length of the choke duct 28. Its opening part nearer the internal space 6 of the housing is made up of several, and in the present case four passages 35, which are arranged around the longitudinal axis 14 of the housing and are separated from one another by radially extending ribs 36. The said ribs 36 serve as bearers for a pin-like choke part 37, which is connected with the sleeve-like portion 26 of the length, of the choke member 17, which part 37 extends coaxially to the longitudinal axis of the housing 14 toward the floor 3 and comes to an end short of it.

The choke part 37 has its end, which points away from the sleeve-like portion 26 of the length, extending to the front into a third portion 38 of the choke duct 28, which is arranged between the first and the second duct portions 5 and 34. It is made up of a duct portion 39 nearer the first duct portion 5, to which it is coaxial and preferably several second duct portions 40 which extend transversely in relation to the first duct portion 39, and which communicate with the second duct portion 34. The transitional portion between the two duct portions 39 and 40 constitutes the choke constriction 33, since here the choke portion 37 extends through an opening 43, coaxially opposite to the first duct portion 39, in the duct wall 44 in the third duct portion 38. The depth of penetration of the choke part 37 is predetermined by the setting of the choke member 17, which thus in the transitional part between the two duct portions 39 and 40 presets flow aperture, which is dependent on the depth of penetration and is available for the driving fluid.

The second duct portions 40 open into the internal space 6 of the housing and communicate via the same with the passages 35 leading to the second duct portion 34.

As already mentioned, a device 45 is provided between the choke member 17 and the housing 1 to prevent relative rotation thereof. It is for example in the duct wall 44 which delimits the extent of penetration or overlap between the choke part 37 and the third duct portion 38. It is preferably constituted by at least one, and more especially more than, one longitudinal rib 46 which is provided on the outer periphery of the choke part 37, extends in the direction 23 of setting, runs in complementary groove-like recesses 47, which are provided in the peripheral part of the opening 43. It is in this manner that reliable prevention of rotation, whatever the position of setting, is ensured while at the same time ensuring an effective axial guiding effect.

The duct wall 44 may be an integral part of the housing 1. However in the present working embodiment it is a component of an insert part 48, which is fixedly connected to the housing 1 and is inserted into the internal space 6 of the housing. Such insert part has a bell-like configuration with a disk-like attachment portion 49 and a cap-like head portion 52 with a lesser diameter. The attachment portion 49 is peripheral secured to the side wall 2 and divides the internal space 6 of the housing into a first space portion 52, which communicates with the first connection opening 29, and a second space portion 54, which communicates with the second connection opening 30. The head portion 52 extends into the second space portion 54 and comprises the choke constriction 33 as well as the two duct portions 39 and 40. The driving fluid is now forced to go through the choke constriction 33 when the choke is in operation.

Since in the case of the choke valve in accordance with embodiment it is a question of 8 choke check valve, 8 check valve device 55 is also integrated in the housing 1. It is arranged in parallel to the choke constriction 33 and is so designed that it renders possible a flow of the driving fluid in one direction without passing through the choke constriction 33, whereas when the driving fluid is flowing in the opposite direction it shuts down the one or more shunt ducts 56 so that the driving fluid is obliged to take the flow path via the choke constriction 33. As shunt ducts 56 several interruptions in the attachment portion 49 are provided in the illustrated working embodiment, which directly connect the two space portions 53 and 54 with one another. These shunt ducts 56 are radially outside the head portion 52 and are distributed circumferentially about it along the periphery thereof. They have a common valve member 57, and from the one axial side thereof, covering over the shunt ducts 56, the valve member 57 rests on the attachment portion 49. Since in the illustrated working embodiment an unchoked, free passage connection is desired from the first to the second connection opening 29 and 30, the valve member is provided on the axial side, which faces the upper first space portion 53, of the attachment portion 49. It is secured to the insert part by means of a radially internal annular holding portion 58, whereas the closing portion 59, which is radially to the outside and is also annular, only rests loosely on the attachment portion 49 so that, dependent on the direction of the flow, it is either thrust in a sealing fashion against the attachment portion 49 shutting off the shunt ducts 56, or, clearing the shunt ducts 56, it is moved clear of the attachment portion 49. In order to facilitate fitting of the valve member the insert part 48 is divided in its head portion 52 into two. The holding portion 58 is mounted on a collar-like portion 60 joined with the closing portion 59 and is flanked and held by a cap-like portion 63 also mounted on the latter. Since the portion 63 contributes to preventing rotation of the choke member 17, it is mounted on the collar-like portion 60 in such a manner as to prevent relative rotation thereon, as for example by having suitable detent means 64.

On the axial side remote from the shunt ducts 56 it is possible for the valve member 57 to be flanked by one or more stabilizing arms 65, which, extending out from the head portion 52, run radially outward and are secured to the latter. They are preferably so designed that they engage the valve member 57 in that part, which is on the "pitch circle" of the shunt ducts 56. It is in this manner that the elastic closing portion 59 is prevented from elastically snapping into a skirt-like form and not returning into the shutting position. Such a stabilizing arm 65 which is associated with the valve member 57, is adjacent to each shunt or bypass duct 56. Adjacent to each shunt duct 56 it is possible for the valve member 57 to be furnished with such a stabilizing arm 65. The configuration 66 of the stabilizing elements 65 is however to be so selected that they do not hinder the switching motion of the valve member 57.

The check valve device 55 means that the overall width of the choke valve is not increased while its overall length is only slightly increased. The two connection ports 29 and 30 and the check valve device 55 are positioned coaxially in a row. The adjustment side for the choke member, which is predetermined by the actuating section 13, us also the second connection side as determined by the second connection port 30 so that all in all there is an extremely compact and economically manufactured device. In principle it would be feasible for the entire choke valve to be produced using plastic material or, respectively, polymer material.

The choke valve in the example is so designed that it can be mounted with its screw-in port 4, provided for the first connection opening 29, directly on a device or item of equipment to be actuated by fluid power. It is in this manner that the choke valve may for example arranged directly on a fluid power cylinder by screwing it into a connection opening provided therein. Adjacent to the second connection opening 30 it would in principle be possible also to provide means making possible the screw mounting of a component leading to further equipment. It is however substantially more advantageous to adopt the configuration illustrated in connection with the present embodiment, in which the second connection opening 30 is provided with a plug in connection device 67 for fluid power pipes and/or hoses, secured to the choke member. It is preferred for the choke member 17 itself to constitute the housing of the plug connection device 67, into which a gripping ferrule 68 is inserted, by means of which the pressure pipe or pressure hose, respectively, will be detachably connected to the choke member 17. In the embodiment of the invention the second channel section 34, which adjoins the second connection opening 30, constitutes the seat to receive a preferably annular or sleeve-like ferrule 68 so that there is an extremely short overall length. The second connection opening 30 and the one plug in opening 69 for the associated fluid power line for the gripping ferrule 68 with the associated fluid power line are in this case arranged concentrically.

In order to connect a fluid power line with the second connection opening 30 it is merely necessary for the gripping ferrule 68 to be inserted into the plug in opening 69 until it is gripped and held by the holding elements 70 of the same. In order to remove the fluid power line again, in the working embodiment a thrust is exerted on the gripping ferrule 60 axial downwards, this causing the holding elements 70 to release the inserted fluid power line for withdrawal thereof.

Details of a preferred design of the plug connection device 67 will be seen in the German patent publication 4,007,101C1, which is incorporated herein by reference so that at this point no detailed account thereof is required. Like the plug connection device described therein it is possible in this case to insert a seal means 71 after the gripping ferrule 68 in the second duct portion 34, such seal device encircling the inserted fluid power line in a sealing fashion and providing a sealing action in relation to the choke member 17 functioning as a housing. The second duct portion 34 may be readily so configured that it takes into account the specific type of plug connection device 67.

The plug connection device 67 is preferably so designed that an inserted fluid power line remains able to freely rotate about the longitudinal axis 14 of the housing in relation to the choke member 17. In the illustrated working embodiment this is made possible because the gripping ferrule 68 is received in the second duct portion 34 in a suitably rotatable fashion.

In order to alter the flow rate with the fluid power line connected with the connection opening 30 it is only necessary to grip the actuating portion 13 on the radially outwardly facing peripheral part and to turn it. In order to facilitate such actuation the respective peripheral portion may for instance be knurled. It may also be so designed that a wrench can be utilized thereon.

For temporary locking in the selected position of setting in the working embodiment a securing element 73 is present with which the selected relative position between the actuating element 7 and the choke member 28 can be locked. It is preferably constituted by a lock nut 74 set on the external screw thread 25 and arranged axially clear of the actuating element 7 and able to be clamped thereon.

I claim:

1. A choke valve comprising a housing wherein a choke duct extends to be in communication with two connection ports arranged coaxially in relation to one another and at opposite ends of the housing for the supply and/or removal of a driving fluid and a choke member arranged on the housing to cooperate with the choke duct and able to be set by being moved in two opposite directions for altering the flow aperture thereof in a setting direction in relation to the housing, wherein one of the connection ports is provided on the choke member, the connection port being directed in the setting direction and the connection port on the choke member communicating with the choke duct which extends through the choke member, wherein at least one of the connection ports comprises a plug connection device for detachable connection to a fluid power hose, and wherein the choke member comprises a housing of a plug connection device in the form of a gripping ferrule which is able to be freely turned in relation to the choke member, the...plug connection housing being provided in a duct portion associated with the choke member and being able to be actuated externally on the plug connection housing.

2. The choke valve as set forth in claim 1, wherein a check valve device is arranged between the two connection ports in the housing.

3. The choke valve as set forth in claim 1, wherein the choke member possesses a sleeve-like length portion with the associated connection port therein and coaxially adjoining a more especially pin- or stub-like choke portion cooperating with the choke duct, and wherein between the sleeve-like length portion and the choke portion in the peripheral extent of the choke part at least one passage is provided, by way of which the portion, extending in the choke member, of the choke duct communicates with the portion, extending in the housing, of the choke duct.

4. The choke valve as set forth in claim 1, comprising in the peripheral portion of the choke member an actuating element extending out of the housing, which element is adapted to drivingly cooperate with the choke member and to be operated to cause a setting movement of the choke member.

5. The choke valve as set forth in claim 1, wherein the choke member is locked to prevent rotation around an axis extending in the setting direction in relation to the housing and by way of a screw thread is in engagement with an annular or sleeve-like actuating element, which concentrically surrounds it, which element is arranged rotatabley in relation to housing and is fixed in the setting direction.

6. A choke valve comprising a housing wherein a choke duct extends to be in communication with two connection ports arranged coaxially in relation to one another and at opposite ends of the housing for the supply and/or removal of a driving fluid and a choke member arranged on the housing to cooperate with the choke duct and able to be set by being moved in two opposite directions for altering the flow aperture thereof in a setting direction in relation to the housing, wherein one of the connection ports is provided on the choke member, the connection port being directed in the setting direction and the connection port on the choke member communicating with the choke duct which extends through the choke member, and wherein at least one of the connection ports comprises a plug connection device for detachable connection to a fluid power hose, wherein the choke member is locked to prevent rotation around an axis extending in the setting direction in relation to the housing and by way of a screw thread is in engagement with an annular or sleeve-like actuating element, which concentrically surrounds it, which element is arranged rotatably in relation to housing and is fixed in the setting direction, and wherein the choke valve further comprises a securing element in order to lock the relative position between the choke member and the actuating element, such securing element preferably being constituted by a lock nut borne by the choke member and able to be clamped on the actuating element.

7. A choke valve comprising a housing wherein a choke duct extends to be in communication with two connection ports arranged coaxially in relation to one another and at opposite ends of the housing for the supply and/or removal of a driving fluid and a choke member arranged on the housing to cooperate with the choke duct and able to be set by being moved in two opposite directions for altering the flow aperture thereof in a setting direction in relation to the housing, wherein one of the connection ports is provided on the choke member, the connection port being directed in the setting direction and the connection port on the choke member communicating with the choke duct which extends through the choke member, and wherein at least one of the connection ports comprises a plug connection device for detachable connection to a fluid power hose, wherein the choke member is locked to prevent rotation around an axis extending in the setting direction in relation to the housing and by way of a screw thread is in engagement with an annular or sleeve-like actuating element, which concentrically surrounds it, which element is arranged rotatably in relation to housing and is fixed in the setting direction, and wherein the actuating element is rotatably mounted in a recess in the housing and possesses an actuating portion adjoining the guide portion and provided outside that said recess, which actuating portion preferably projects radially out past the guide portion.

8. The choke valve as set forth in claim 1, wherein the housing possesses a substantially cylindrical external configuration, the two connection ports being arranged at two opposite ends of the housing.

9. A choke valve comprising:

a housing, said housing including an axial choke duct;

a first connection port provided on the housing for mounting said choke valve to a device;

a choke member having a choke portion and a sleeve portion arranged at opposite ends of the choke member, the choke member being positioned within the housing to cooperate with the choke duct, the choke member being actuatable in an axial direction to alter a flow aperture formed by the choke portion in the choke duct, wherein the choke member is locked to prevent rotation around an axis extending in a setting direction in relation to the housing and by way of a screw thread is in engagement with a sleeve-like actuating element arranged rotatably in relation to the valve housing and is fixed in the setting direction and wherein the actuating element is rotatably mounted in a recess in the valve housing and possesses an actuating portion adjoining a guide portion, the actuating portion projecting radially beyond the guide portion, a second connection port provided on the sleeve portion choke member for releasably attaching a fluid power hose, wherein the first and second connection ports are arranged coaxially in relation to one another at opposite ends of the choke duct thereby providing a space saving choke value arrangement.

10. A choke valve comprising:

a housing, said housing including an axial choke duct;

a first connection port provided on the housing for mounting said choke valve to a device;

a choke member having a choke portion and a sleeve portion arranged at opposite ends of the choke member, the choke member being positioned within the housing to cooperate with the choke duct, the choke member being actuatable in an axial direction to alter a flow aperture formed by the choke portion in the choke duct;

a second connection port provided on the sleeve portion choke member for releasably attaching a fluid power hose, wherein the first and second connection ports are arranged coaxially in relation to one another at opposite ends of the choke duct thereby providing a space saving choke value arrangement, and a plug connection device, associated with at least one of the two connection ports, for the detachable connection of fluid power piping, wherein the choke member comprises a housing of the plug connection device in the form of a gripping ferrule which is able to be freely turned in relation to the choke member, the plug connection device being provided in a duct portion associated with the choke member and being able to be actuated by means external to the plug connection housing.

11. The choke valve as set forth in claim 9, wherein a check valve device is arranged between the two connection ports in the housing.

12. A choke valve comprising:

a substantially cylindrical housing, said housing including an axial choke duct therethrough and a first connection port in communication with the choke duct, the housing further including an actuating element which can rotate about a longitudinal axis of the housing;

a choke member having a choke portion and a sleeve portion arranged at opposite ends thereof, the choke member being positioned within the housing to cooperate with the choke duct, the choke member being in actuatable engagement with the actuating element to move the choke member in an axial direction to alter a flow aperture formed by the choke portion in the choke duct, wherein the sleeve of the choke member forms a housing for a second connection port, said second connection port being a plug connection device for detachable connection of a fluid power hose, and wherein the first and second connection ports are arranged coaxially in relation to one another at opposite ends of the choke duct; and a check valve means arranged in the housing allowing full fluid flow in one direction and restrained fluid flow in an opposite direction.

13. The choke valve as set forth in claim 12, wherein the choke member is locked to prevent rotation around the longitudinal axis by way of a screw thread in engagement with a sleeve-like actuating element, the actuating element being arranged rotatably in relation to housing and fixed in a setting direction.

* * * * *